(12) United States Patent
Chung

(10) Patent No.: US 8,495,158 B2
(45) Date of Patent: Jul. 23, 2013

(54) METHOD FOR DELIVERING WILLS AND MESSAGES

(76) Inventor: Bo Ram Chung, Rancho Palos Verdes, CA (US)

( * ) Notice: Subject to any disclaimer, the term of this patent is extended or adjusted under 35 U.S.C. 154(b) by 0 days.

(21) Appl. No.: 13/548,159

(22) Filed: Jul. 12, 2012

(65) Prior Publication Data

US 2013/0110982 A1    May 2, 2013

(30) Foreign Application Priority Data

Oct. 28, 2011    (KR) ........................ 10-2011-0111089

(51) Int. Cl.
*G06F 15/16* (2006.01)
(52) U.S. Cl.
USPC ........... 709/206; 709/203; 709/217; 709/219; 709/230; 726/1
(58) Field of Classification Search
USPC ................. 709/205–207, 217, 229, 232, 203, 709/219, 230; 705/1; 726/1, 4
See application file for complete search history.

(56) References Cited

U.S. PATENT DOCUMENTS

| | | | |
|---|---|---|---|
| 7,424,515 B2 * | 9/2008 | Collet et al. .................. | 709/206 |
| 8,261,293 B2 * | 9/2012 | Fletcher et al. ............... | 719/328 |
| 2002/0019744 A1 * | 2/2002 | Yamamoto ........................ | 705/1 |
| 2005/0108343 A1 * | 5/2005 | Collet et al. .................. | 709/206 |
| 2006/0029199 A1 * | 2/2006 | Osterer et al. ............. | 379/88.22 |
| 2008/0167994 A1 * | 7/2008 | Li et al. .............................. | 705/1 |
| 2008/0184334 A1 * | 7/2008 | Hebert et al. ..................... | 726/1 |
| 2010/0325699 A1 * | 12/2010 | Kaczmarek et al. .......... | 709/205 |
| 2012/0047055 A1 * | 2/2012 | Aiello ............................ | 705/35 |

FOREIGN PATENT DOCUMENTS

| KR | 10-1999-0016683 A | 3/1999 |
|---|---|---|
| KR | 10-2002-0056811 A | 7/2002 |
| KR | 10-0368469 B1 | 1/2003 |
| KR | 10-2007-0010537 A | 1/2007 |

* cited by examiner

*Primary Examiner* — Ramy M Osman
(74) *Attorney, Agent, or Firm* — Park, Kim & Suh, LLC

(57) ABSTRACT

Disclosed herein is a method of delivering wills and messages, in which the death of an invitor is verified by one or more invitee(s)/verifier(s) close to the invitor, and then the will and message of the invitor are delivered to the invitee(s). The method of delivering wills and messages enables not only an invitor to efficiently and reliably leave behind a will and a message to one or more invitee(s) but also the death of the invitor to be quickly determined by the invitee(s), thereby improving the reliability of the determination of death.

16 Claims, 4 Drawing Sheets

METHOD FOR DELIVERING WILLS AND MESSAGES

This application claims the benefit of Korean Patent Application No. 10-2011-0111089, filed on Oct. 28, 2011, which is hereby incorporated by reference as if fully set forth herein.

BACKGROUND OF THE INVENTION

1. Field of the Invention

The present invention relates generally to a method of delivering wills and messages, in which the death of an invitor is verified by one or more invitee(s) close to the invitor, and then the will and message of the invitor are delivered to the invitee(s) and, more particularly, to a method of delivering wills and messages, which enables not only an invitor to efficiently and reliably leave behind a will and a message to one or more invitee(s) but also the death of the invitor to be quickly determined by the invitee(s), thereby improving the reliability of the determination of death.

2. Description of the Related Techniques

Although it is said that dead men does not speak, it is necessary to deliver his/her will and/or a message, which an invitor wanted to say in his or her living years but he or she could not say, after his or her death in such a manner that a will and/or a message designed by a person (hereinafter referred to as "invitor") who wants to leave behind the will and/or deliver the message after his or her death in his/her living years are made to be delivered to one or more people (hereinafter referred to as "invitee(s)") who receive the will and/or the message.

Furthermore, in order to deliver a message at a specific time, an invitor may want to deliver a stored message to one or more designated people (that is, invitee(s)) at a designated time, in which case the method can be helpful to a schedule that puts emphasis on the timing. Therefore, there is a need for a hybrid, new type of method of delivering wills and messages that enables a will and a message to be delivered to the e-mail addresses of invitee(s) and also to be posted onto the message board (for example, wall) of the social network service (SNS) of an invitor, thereby being suitable for the trends of the current era.

That is, although times have changed, most people think of notarization, documentation and succession to property with the aid of a lawyer, in connection with wills. The will prepared with the aid of a lawyer is intended merely to provide legal force to the will, and currently such a will is not considered to be a precious message to be delivered to close people. Furthermore, for example, a person gets to keep company with at least one hundred people throughout his or her life. After the death of the person, it is difficult to deliver his or her desired message to so many people.

Accordingly, if it is possible to access the Internet and then leave behind a message regardless of time and place in the case in which an invitor abruptly wants to leave behind a message to family members or relatives during his or her vacation in a foreign country, in the case in which an invitor wants to leave behind a message while walking or in the case in which an invitor wants to leave behind a message on a business trip, the desired message of the invitor can be delivered to the close family members or relatives, for example, even when the invitor suddenly dies as a result of an accident on the way back home, and the message will be very precious to the invitee(s).

In particular, recently, the use of smart phones has become popular and recording a video or an audio or composing a text can be immediately performed and then stored in a single message using one of a variety of applications provided in smart phones, so that the scheme can be used over the wired Internet or the wireless Internet anytime and anywhere.

Furthermore, recently in spite of the computerization of all types of information, wills need to be notarized by lawyers in order for the wills to be legally enforceable. In the future, it will be necessary to computerize wills, build a user-friendly messenger server, and ensure the rights to enjoy the last lives of the users. It is apparent that the option of delivering all files to a lawyer after the determination of death may be provided.

Moreover, it is difficult for the poor people to deliver their precious messages after their death because they cannot come up with expensive legal fees. Young people and elementary school students also have the rights to deliver their precious messages to family members or relatives.

SUMMARY OF THE INVENTION

Accordingly, the present invention has been made keeping in mind the above problems occurring in the prior techniques, and an object of the present invention is to provide a method of delivering wills and messages, the death of an invitor being verified by one or more invitee(s) close to the invitor and then the will and message of the invitor being delivered to the invitee(s), wherein an invitor can not only efficiently and reliably leave behind a will and a message to one or more invitee(s) but also the death of the invitor can be quickly determined by the invitee(s), thereby improving the reliability of the determination of death.

In order to accomplish the above objects, the present invention provides a method of delivering wills and messages, in which the death of an invitor is verified by one or more invitee(s) close to the invitor, and then the will and message of the invitor are delivered to the invitee(s), the method including a membership subscription step of accessing the messenger server and entering subscriber information, thereby storing the subscriber information and creating an account in a subscriber database (DB) of the messenger server; the will and message preparation step of storing the will and message written by the invitor in a will and message DB of the prepared server; an invitee(s) selection step of, when the invitee(s) are selected by the invitor to receive the will and the message, storing information about the selected invitee(s) in the subscriber DB; the delivery method determination step of selecting one of methods for starting to deliver the will and message of the invitor to the invitee(s) and storing the method in deliver method setting memory of the messenger server; and the deliver step of, if a requirement for starting the delivery of the will and the message stored in the deliver method setting memory is met, delivering the will and the message to the invitee(s).

The invitee(s) selection step includes the steps of sending an invitation prepared by the invitor to the selected invitee(s) and finally selecting as one or more invitee(s) who will receive the will and the message depending on whether the former invitee(s) who have received the invitation have accepted the invitation.

The method may further include a will and message preparation step of storing the will and the message written by the invitor in the will and message DB of the messenger server; and a step of determining a location of the invitor using an IP address of an invitor terminal which has accessed the messenger server and a global positioning system (GPS).

The one of methods for starting the delivery of the will and the message selected at the delivery method determination step may be a method of comparing the "Identification Number that identify the identity" of the invitor stored in the subscriber DB with "Identification Number that identify the identity" on a death-record provided by a government office, and delivering the will and the message if the death of the invitor has been determined based on the death-record.

The one of methods for starting the delivery of the will and the message selected at the deliver method determination step may be a method of delivering the will and the message on a date and at a time selected by the invitor.

The one of methods for starting the delivery of the will and the message selected at the delivery method determination step may be a method including a primary death determination that determines whether the invitor has accessed the messenger server within a predetermined period and a secondary death determination that is performed using a poll of the invitee(s) if the invitor has not accessed the messenger server within the predetermined period.

The secondary death determination may be performed by receiving poll information indicative of a selection of "Yes (dead)", "Uncertain (don't know & not sure)" and "No (survival)" from each of the invitee(s), and determining that the invitor is dead only if the percentage of number of votes for "Yes" in the poll information exceeds a reference percentage of a number of total votes of the poll.

It may be determined that the invitor is dead only if the number of votes for "No" is less than a set value, even if the percentage of the number of votes for "Yes" in the poll information exceeds the reference percentage of the number of total votes of the poll.

The method may further include, prior to the deliver step of delivering the will and the message, a step of the messenger server accessing a mobile device(s) of the invitor and determining whether the invitor has used the mobile device(s) within a predetermined period.

The one of methods for starting the delivery of the will and the message selected at the delivery method determination step may be changed in accordance with an intention of the invitor, in which case the stored will and message can be maintained without change so that re-recording or re-entering is not required, and a delivery method of the messenger server is reset based on the changed method for delivering the will and the message and stored in the memory.

The method may further include a step of determining whether the invitor has allowed access to his or her Social Network Service (SNS) and storing results of this determination in the delivery method setting memory of the messenger server; wherein if the access to the SNS has been allowed, the SNS is used at the delivery step of delivering the will and the message, and one or more users linked to the SNS are set as the invitee(s).

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
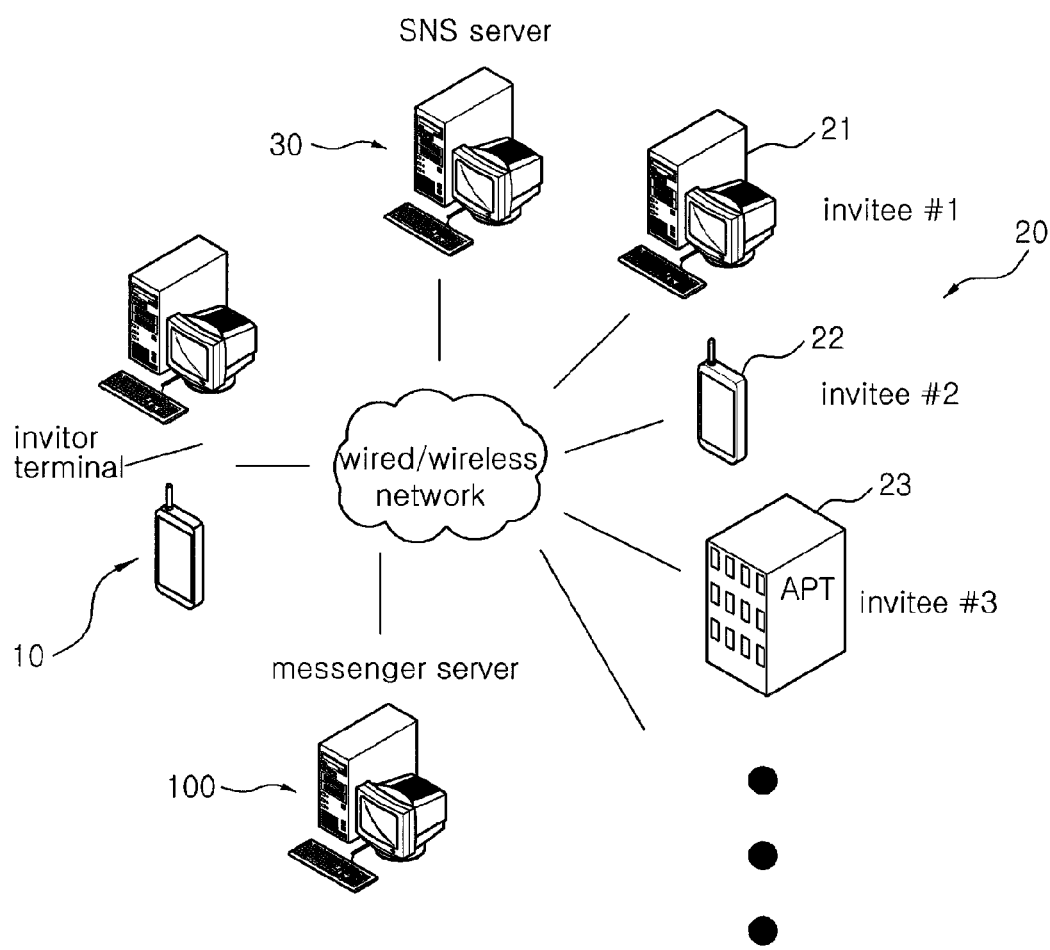
FIG. 1 is a diagram showing a configuration to which a method of delivering wills and messages according to the present invention can be applied.

References should be made to the drawings, throughout which the same reference numerals are used to designate the same or similar components.

A method of delivering wills and messages according to a preferred embodiment of the present invention will be described in detail below with reference to the accompanying drawings.

Prior to describing the present invention in detail below, the terms that will be used in the detailed description will now be defined. The term "invitor" refers to a person who leaves behind a will or a message, and the term "invitee(s)" refers to a person who receives the invitor's will or message.

Furthermore, the term "will" refers to a sole declaration of intention without a counterparty which has legal force after death. The term "message" refers to a message that is delivered by an invitor to one or more invitee(s) regardless of the legal force or the time of death of the invitor. The term "death message" refers to a message that provides notification of the death of an invitor upon the death of the invitor.

The "death" that is determined in a procedure for determining death in the system of the present invention does not mean the death that is diagnosed by a doctor in the hospital, but is determined by the specific death determination methods of the present system and invention.

First, as can be seen from FIG. 1, the method of delivering wills and messages according to the present invention requires a messenger server 100 for relaying the delivery of a will and/or a message so that an invitor can deliver the will and/or the message to at least one or more invitee(s) terminals 20 (or directly to invitee(s)) using an invitor terminal 10 such as a computer, a notebook computer, or a portable mobile device(s). In this case, the messenger server 100 provides notification of a variety of types of information, such as the will or message of the invitor, using an SNS server 30 to which the invitor has subscribed, and may use the addresses or the like of a variety of invitee(s) (for example, friends or fellow workers) which are connected to the SNS of the invitor.

Figure 2:
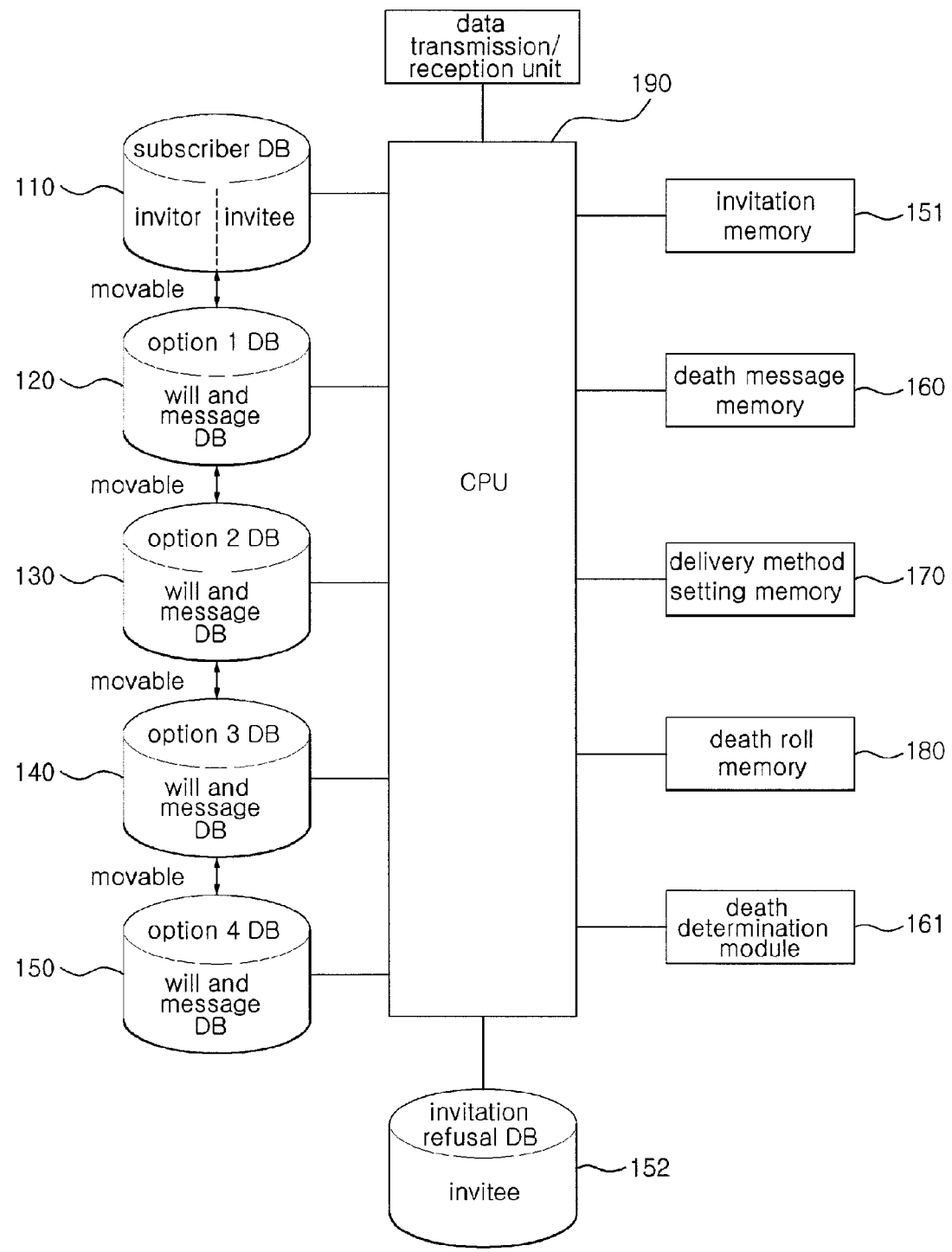
FIG. 2 is a diagram showing the configuration of a messenger server that is used in the method of delivering wills and messages according to the present invention.

For this purpose, the messenger server 100, as shown in FIG. 2, includes a subscriber DB 110 for storing personal information and accounts entered by not only invitors but also invitee(s) when they subscribe, and storing the information of each subscriber in an invitor section when the subscriber is in the position of an invitor or in an invitee(s) section when the subscriber is in the position of an invitee(s), and a plurality of will and message DBs 120, 130, 140 and 150 for storing the will or message left behind by the invitor, more specifically for storing it in a different DB depending on the deliver method.

Furthermore, the messenger server 100 further includes invitation memory 151 for storing the layout and content of an invitation that is sent by the invitor to the invitee(s), death message memory 160 for storing a death message which will be sent upon the death of the invitor, a death determination module 161 for determining the death of the invitor using a method selected by the invitor in the future, delivery method setting memory 170 for storing the will or message delivery method, and death-record memory 180 for storing a death-record provided by a government office such as a ward office or a town office or appropriate agency, so that it can be compared with the "Identification Number that identify the identity" of the invitor.

It will be apparent that the messenger server 100 additionally includes the terminals of the invitor and the invitee(s), a data transmission and reception unit configured to take charge of data communication, a central processing unit (CPU) 190 configured to take charge of the processing of the above components, and an invitation refusal DB 152 configured to store an invitation when the invitee(s) has refused the invitation.

Figure 3:
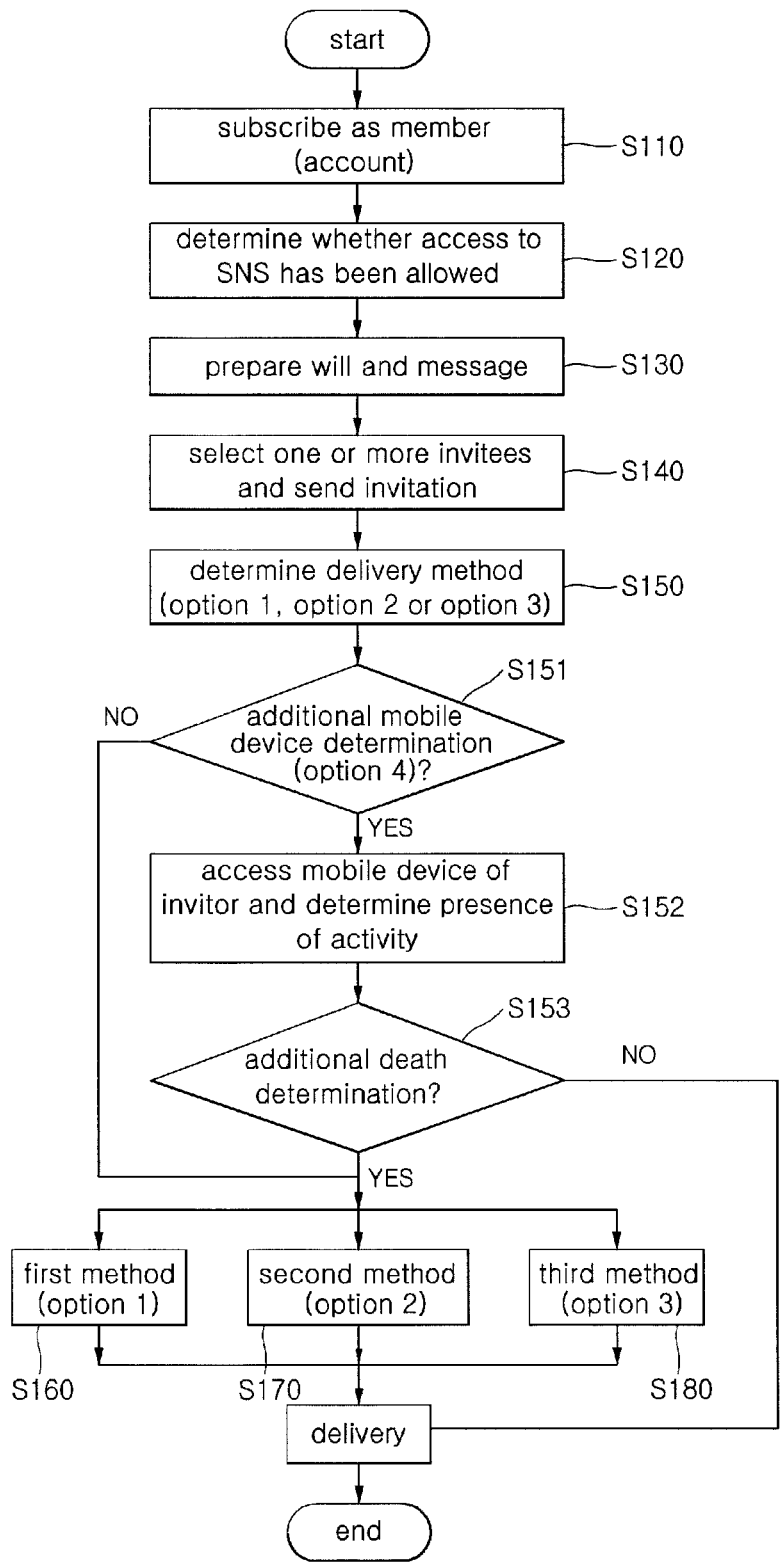
FIG. 3 is a flowchart showing the method of delivering wills and messages according to the present invention.

Meanwhile, as shown in FIG. 3, the method of delivering wills and messages according to the present invention includes a membership subscription step S110 of accessing the messenger server 100 and entering subscriber information, thereby storing subscriber information in the subscriber DB 110 and creating an account; a will and message preparation step S130 of storing a will and a message created by an invitor in the will and message DB 120, 130, 140 and 150; an invitee(s) selection step S140 of, when an invitee(s) who will receive the will and the message has been selected by the invitor, storing information about the selected invitee(s) in the subscriber DB 110; the deliver method determination step S150 of selecting a method by which the will and message of the invitor will be delivered to the invitee(s) and storing the method in the delivery method setting memory 170; and delivery steps S160, S170 and S180 of, when the requirements for the starting of the delivery of the will and the message stored in the delivery method setting memory 170 have been met, delivering the will and the message to the invitee(s).

Meanwhile, given the active participation in social activities using SNSs, the method of delivering wills and messages further comprises step S120 of determining whether access to an SNS that is being used by the invitor is allowed. Thereafter, the results of the determination of whether the access to the SNS being allowed or not are stored in the deliver method setting memory 170 of the messenger server 100. If access to the SNS is allowed, it is preferable that the SNS be used during the process of delivering the will and the message and a user linked to the SNS to be also set as the invitee(s).

Furthermore, at the invitee(s) selection step S140, it is preferred that the invitation created by the invitor to be sent to the selected invitee(s), and the invitee(s) who has received the invitation be finally selected as the receiver(s) of the wills and messages if he/she as invitee(s) accepts the invitation.

Furthermore, it is preferred that the one method for starting the delivery of a will and a message (see S160) that is selected at the determination step S150 be a method of delivering wills and messages when the death of the invitor is discovered on a death-record provided by a government office (such as, a ward office or a town office or appropriate office) or the like by comparing the "Identification Number that identify the identity" of the invitor stored in the subscriber DB 110 with the "Identification Number that identify the identity" on the death-record.

Furthermore, it is preferred that another method for starting the delivery of a will and a message (see S170) that is selected at the delivery method determination step S150 be a method of delivering wills and messages at the certain time and date selected by the invitor.

Furthermore, it is preferred that another method of delivering the will and a message (see step S180) to be selected at the delivery method determination step S150 be a method including the primary death determination that determines whether the invitor had accessed the messenger server 100 within the predetermined period and the secondary death determination that is performed by the poll of invitee(s) if the invitor has not accessed the messenger server 100 within the predetermined period.

Furthermore, it is preferred that the secondary death determination be performed by receiving poll information, that is, a selection of "Yes (dead)", "Uncertain (don't know & not sure)" and "No (survival)," from each of the invitee(s) and determining that the invitor is dead only when the percentage of the number of votes for "Yes" in the overall poll information exceeds a reference percentage (for example, 50%).

Furthermore, it is preferred that the invitor be determined to be dead only when the number of votes for "No" is smaller than a set value even if the percentage of the number of votes for "Yes" exceeds the reference percentage, so that it is determined that the invitor is not dead when, as an example, at least one of the invitors directly designated by the invitor casts a vote for "No."

Furthermore, it is preferable to make sure that the invitor is dead by additionally performing, prior to the delivery step of delivering the will and the message, steps S151, S152 and S153 at which the messenger server accesses the mobile device(s) of the invitor and determines whether the invitor has used the mobile device(s) within a predetermined period.

More specifically, subscribers (that is, users) who gain access via the Internet or in a mobile fashion at the membership subscription step S110 are classified into invitors and invitee(s). An "invitor" refers to a person who desires to store and deliver his or her will and message, and an "invitee(s)" refers to a person who receives the will and the message from the invitor. The messenger server 100 delivers wills and messages by relaying between the invitors and the invitee(s).

From the point of view of an invitor, a user accesses the messenger server 100 and undergoes an account registration process and an authentication process in order to become an invitor, and creates an account in order to use the messenger server 100.

The account of the invitor who has completed the creation of the account is divided into an invitor section and an invitee (s) section. The reason for this is that the invitor may become an invitee(s) when the invitor received and accepted an invitation from another invitor. For the same reason, the subscriber DB 110 is divided into an invitor section and an invitee(s) section.

At the SNS allowance checking step S120, if there is an SNS to which the invitor has subscribed, access to the SNS is requested. "SNS" stands for "social network service." If the invitor allows access, information about allowing access is stored in the subscriber DB 110, and the SNS is used as one delivery path upon the death of the invitor while the procedure is being performed via the SNS server used by the invitor. When an invitor invites invitee(s), the invitor may retrieve the contact information of acquaintances who have subscribed to their SNS.

The term "death" corresponds to the case in which a death is determined by comparing the "Identification Number that identify the identity" of an invitor with a death-record, the case in which a death is determined by the login status of an invitor, or the case in which a VERI procedure has not been conducted by an invitor within a predetermined period, which will be described in detail later, after a death determination procedure has been conducted via the messenger server 100. The "VERI" refers to a procedure in which a death is determined on the messenger server 100.

In the case of an invitor who refused the access to his/her SNS, all of the procedures via the SNS will be omitted when the procedures for delivering a will and a message are conducted. In contrast, if the access to the SNS is allowed, the will and message or death message of the invitor may be uploaded and posted to the message board (for example, a wall) provided by the SNS server, so that a notification of a death may be more quickly provided to their valuable people of the invitor using the SNS message board of the invitor without designating them as invitee(s) in accordance with the era in which SNSs are being used as a phonebook.

However, since there is an option of storing people's contact information in an e-mail distribution list so that the messenger server 100 can send a death message upon the death of the invitor even when the invitor refuses access to the SNS, the death message can be distributed among the designated people even when access to the SNS was refused.

A "death message" refers to a message notifying of the death of the invitor, which is sent to the e-mail addresses stored in the e-mail distribution list upon the death of the invitor. Information in the death message may include the e-mail address, telephone number and a variety of other contact information of a person who will take care of procedures (reporting a death, arranging a funeral, etc.) upon the death of the invitor. A passage, a photo or the like desired by the invitor may be designated for a death e-mail. A passage, a photo or the like stored in the death message memory 160 may be used as the passage, the photo or the like.

At the will and message preparation step S130, the invitor makes a will and/or a message using one of the following methods, and stores them in one of the will and message DBs 120, 130, 140 and 150 depending on a set will and message delivery method.

For example, a first method is to record a voice and a video using a computer or a mobile device, a second method is to record only a voice using a computer or a mobile device, a third method is to leave a plain message, and a fourth method is to upload a file in a computer, an SD memory card, a mobile device or a storage device to the messenger server 100.

At the invitee(s) selection step S140, the invitor designates one or more invitee(s). A first level criterion that is used to identify the invitee(s) is based on the e-mails of the invitee(s). The e-mail of each invitee(s) is the main point of contact, and the e-mail address and name of the invitee(s) are essential entries. Other contact information of the invitee(s) is optional, and therefore it may be entered or not.

At the delivery method determination step S150, the invitor selects one of the three types of options S160, S170 and S180 including the first method ("OPTION 1") S160, the second method ("OPTION 2") S170 and the third method ("OPTION 3") as a delivery method.

Since the invitor may additionally select another option (fourth method ("OPTION 4")) at subsequent steps S151, S152 and S153 and a death may be determined and a will and also a message may be delivered using the fourth method, the present invention may be thought of as including a total of four delivery methods.

The first method ("OPTION 1") S160 relates to a will and message deliver method and a death determination method, and utilizes the "Identification Number that identify the identity" of the invitor stored in the subscriber DB 110. The invitor who selects this method should enter their "Identification Number that identify the identity" when creating an account at the membership subscription step.

The second method ("OPTION 2") S170 relates to a will and message delivery method, and is a method of delivering wills and messages at a certain set time and date. For this method, the invitor sets the time and date at which a will and a message will be delivered. Here, the time and the date are set based on a location at which the messenger server 100 is located. Preferably, the times and the dates may be displayed in other countries and metropolises where the messenger server 100 is not located.

The third method ("OPTION 3") S180 relates to a will and message delivery method and a death determination method, and is a determination method using the criterion that there is no specific required activity on the messenger server 100 within a predetermined period designated by the invitor.

Since OPTION 1 indispensably requires the "Identification Number that identify the identity" of the invitor, the invitor is required to enter his or her "Identification Number that identify the identity".

In the case of OPTION 2, the invitor sets a desired time and date based on the time and date of the messenger server 100 so that the will and message of the invitor can be delivered on the desired date and at the desired time.

OPTION 3 requires that the death determination module 161 of the messenger server 100 determine whether access has been made within a predetermined period, so that the invitor sets an access checking period which is suitable for him or her. After the predetermined period has elapsed, the death determination module 161 sends a verification link (when the link of a sent mail is clicked on, then connects to a webpage that automatically performs and conducts the access verification procedure) to the e-mail address of the invitor, or sends a verification code to the mobile phone of the invitor. For this purpose, the invitor selects whether to perform the death determination of the messenger server 100 using an e-mail verification method or a mobile phone text verification method in advance.

After the settings of the death determination procedure have been completed and the will and message of the invitor are uploaded, the messenger server 100 may determine whether to indicate the location at which the invitor uploads a file using the IP address of the invitor terminal having accessed the messenger server 100 and a Global Positioning System (GPS) to directly enter a location, or to indicate no location.

Preferably, when the messenger server 100 additionally stores the location of the invitor in one of the will and message DBs 120, 130, 140 and 150 using the IP address and a GPS. Accordingly, the uploaded location/date/time is indicated on the will and the message of the invitor.

However, when the will and message of the invitor are uploaded to the messenger server 100 using the IP address of the invitor and a GPS, the IP address of the invitor, GPS information and the location are internally stored for security purposes.

The will and the message are uploaded only for the invitor who has approved access to their SNS. At the same time, an SNS upload message determined by the invitor in advance is posted onto the SNS message board (wall) of the invitor. Furthermore, the will and the message can be posted on the SNS message board (wall) immediately after the determination of the death. By setting the sharing for the uploaded will and message, in which case all people who have been allowed to view the invitor's SNS message board (wall) can view the uploaded will and message.

Meanwhile, it is preferred that the will and message for which the invitor selects one of OPTION 1, OPTION 2 and OPTION 3 for a desired processing path be stored in a corresponding database. For this purpose, the present invention includes the option 1 DB 120, the option 2 DB 130 and the option 3 DB 140 as the will and message DBs 120, 130 and 140, as shown in FIG. 2. Additionally, the option 4 DB 150 is provided for OPTION 4 (which will be described later) for the same purposes.

When respective DBs are constructed for OPTION 1, OPTION 2, OPTION 3 and OPTION 4, a variety of types of information can be moved from the DB based on a previous method to the DB based on a current method even when the mind of the invitor is changed and selects a different death determination method, so that convenience can be achieved in that it is not necessary to re-record or re-write an existing stored will and message. However, it is necessary to set the procedure required by a target death determination method.

Meanwhile, once the above delivery method has been determined, the fourth method ("OPTION 4") may be performed by additionally performing steps S151, S152 and S153 of determining whether the invitor used the mobile device(s), if desired.

The fourth method ("OPTION 4") S151, S152 and S153 is to additionally determine the death of the invitor in such a manner that the messenger server 100 accesses the mobile device(s) of the invitor and determines whether the invitor used the mobile device(s) within a predetermined period.

For this purpose, it is determined whether the invitor has selected a death determination using a mobile device(s) at step S151. If the death determination using a mobile device(s) has been selected, whether the invitor conducted an activity using the device(s) (such as, a phone call log as described below) is determined by accessing the mobile device(s) of the invitor and searching the usage log, at step S152. In contrast, if the death determination using the mobile device(s) has been selected, the other method among S160, S170 or S180 selected at the delivery method determination step S150 is immediately performed.

Furthermore, after the mobile device(s) has been successfully accessed and after checking whether there was an activity at S152, it is determined whether to perform an additional death determination (which is set by the invitor) at step S153. If the additional death determination is required, the one method S160, S170 or S180 selected at the delivery method determination step S150 is performed. If the additional death determination is not required, the delivery step (which will be described in detail below) is performed.

Accordingly, in light of the fact that recently many people use mobile device(s), such as smart phones on a daily basis, it is possible to determine more accurately whether the invitor is dead based on whether the invitor used his or her mobile device(s).

Here, the mobile device(s) refers to such as a feature phone (a model preceding a smart phone equipped with computer functionality), a smart phone, a PDA, or a tablet PC (for example, GALAXY Tab™). The invitor may select one or more of these devices.

Furthermore, when access to the selected mobile device(s) is allowed by the messenger server 100 and also a predetermined period (a time period and one or more days of the week, etc.) is designated, the messenger server 100 accesses the mobile device(s) of the invitor, and searches a telephone call record, an e-mail usage list and an Internet browser usage list, and then determines whether there was activity during the corresponding period.

Thereafter, at the final delivery step, an invitation is sent from the invitor to the e-mail address of the invitee(s). A postcard is sent offline to the invitee(s) who has no e-mail address offline. To send a postcard offline, the name and address of the invitee(s) must have been accurately entered. There are the options of sending an e-mail invitation using a real name or a nickname or anonymously according to the selection of the invitor. A postcard invitation may not be sent anonymously or using a nickname.

The invitation sent as described above may be refused or accepted by the invitee(s). The invitation of the invitee(s) who refused the invitation is stored in an invitation refusal DB. If the will and message of the invitor whose invitation was refused has been stored in an invitation refusal data server, it appears in the invitation refusal folder of the invitee(s) so that the invitee(s) can recover it in the future.

If the invitee(s) who accepted the invitation has not registered his or her account, he or she may register for the account. The invitation received from the invitor is indicated in the "invited section" of the invitee(s)'s account, and the invitee(s) may access the will and message of the invitor after going through the procedure for determining the death of the invitor or at the time and the date designated by the invitor.

The above-described will and message delivery methods OPTION 1, OPTION 2, OPTION 3, and OPTION 4 are message delivery methods that are performed via the designed paths of the messenger server 100.

OPTION 1 requires the invitor to enter the "Identification Number that identify the identity" of the invitor as described above. The administrator (system) compares the "Identification Number that identify the identity" entered as described above with a death-record provided by a government office (ward office, town office or appropriate office).

The death-record is stored in the death-record memory in the form of a data pool. The "Identification Number that identify the identity" of the invitor is periodically compared with the death-record at specific intervals, and the invitee(s) may access the will and message of the invitor whose "Identification Number that identify the identity" matches an entry of the death-record. Hereinafter this procedure is referred to as a "VERI" procedure.

Full access to the will and message of the invitor whose death has been determined as dead is provided to the invitee (s). Hereinafter this is referred to as the "A procedure." If the invitor does not leave behind a will and a message for an invitee(s), a message indicative of the death of the invitor may be sent out by e-mail. Hereinafter this is referred to as the "X procedure." This procedure is also performed when the death is determined.

When OPTION 1 is used, the will and file of the invitor whose death has been determined as dead is delivered to an offline invitee(s) using a CD or a media disk. Hereinafter this is referred to as the "M procedure." The "Identification Number that identify the identity" of the invitor that has not been discovered in the death-record is subjected back to the death determination procedure.

Furthermore, the messenger server 100 requests the invitor to check the contact information of one or more invitee(s) which may change in order to update the contact information. Hereinafter this is indicated by "V."

OPTION 2 is a method of delivering the will and message stored by the invitor at the certain time and date designated by the invitor as described above. In synchronization with the date and time designated by the invitor, the messenger server 100 delivers the will or message of the invitor to the invitee(s) at the time and date designated by the invitor based on the time and date at the location of the messenger server 100. Hereinafter this is indicated by "D." The messenger server 100 initiates the "A", "X" and "SNS" procedures on the designated date and at the designated time.

Meanwhile, OPTION 3 includes a primary death determination that determines the death based on whether an invitor has accessed the messenger server 100 within a period which was set by the invitor and a secondary death determination that determines the death based on a poll of the invitee(s).

Figure 4:
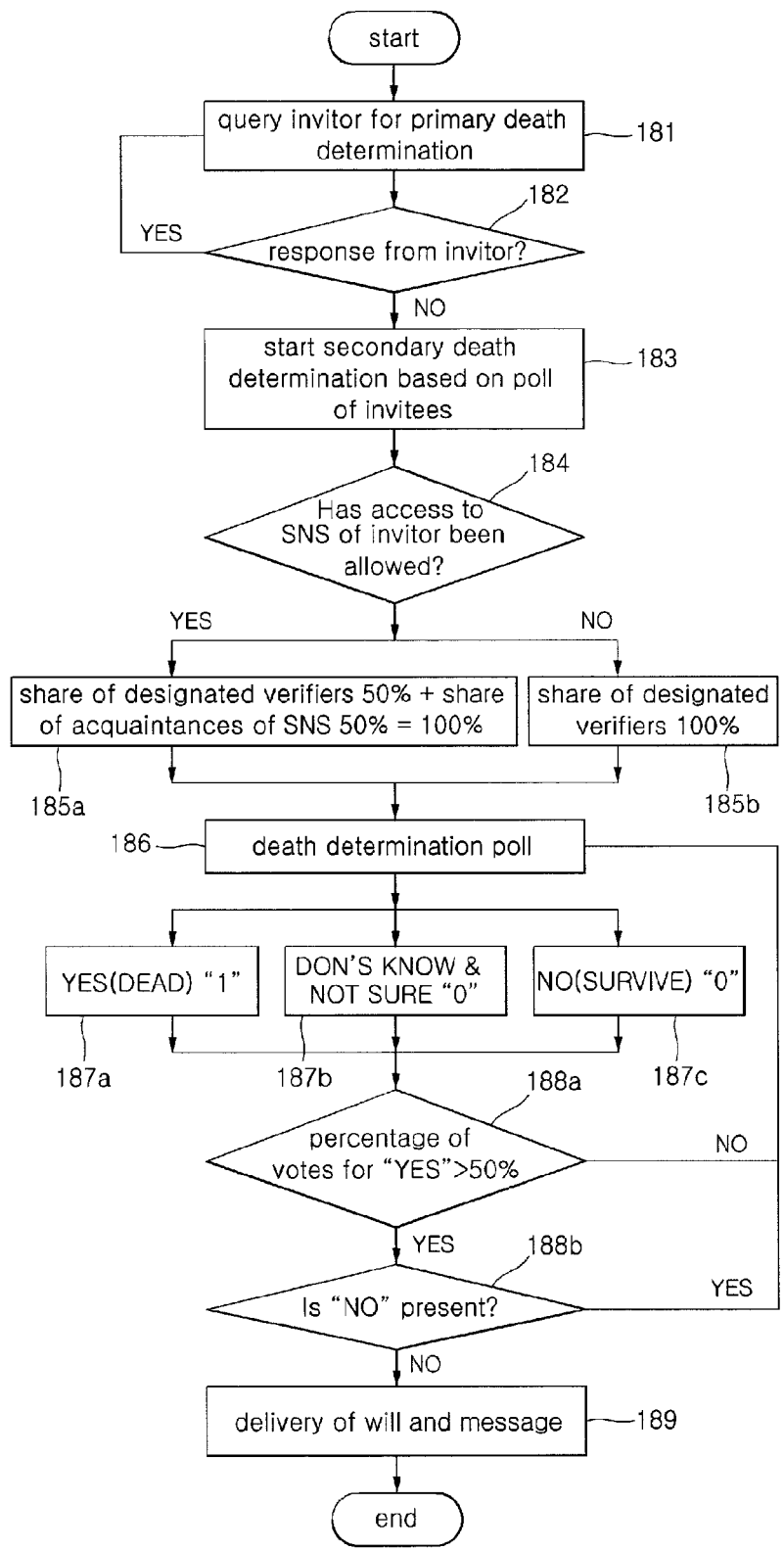
FIG. 4 is a flowchart showing the third delivery method (option #3) of the method of delivering wills and messages according to the present invention.

That is, as shown in FIG. 4, the death determination module 161 performs a primary death determination by querying an invitor who is the target of the death determination at step S181. Thereafter, it is determined whether there is a response from the invitor within a predetermined period at step S181. If the invitor does not make a response, the death determination module 161 more accurately performs the death determination by performing a secondary death determination at step S183. The secondary death determination is performed based on a poll of invitee(s) as described below.

In the primary death determination at step S181, the death determination module 161 sends a death determination verification link to the invitor by e-mail based on the number of days set by the invitor. Accordingly, if the invitor accesses the messenger server 100 by clicking on the verification link at step S182, it is determined that the invitor is not dead. In contrast, if the invitor has not accessed the messenger server 100 within a predetermined number of days, the death determination module 161 initiates the secondary death determination at step S183.

The secondary death determination is a method of determining whether the invitor is dead using a poll based on calculated probabilities. In this case, it is determined whether the invitor has approved access to his or her SNS at step S184, and voters are also determined based on the results of the this determination.

The voters may be verifier(s), SNS friend(s), or a verifier and an SNS friend who were designated by the invitor in the messenger server 100. If the invitor has allowed access to the SNS at S185a, then both the verifier(s) and an SNS friend(s) can cast votes. If the invitor has not allowed access to the SNS at step S185b, only verifier(s) can cast a vote on the determination of death.

A conventional method of directly querying friends is an old-fashioned method. Since this method is a method of querying friends by e-mail or in a wired manner, it is very insufficient in terms of determining the deaths of many invitors because this method is not automated but semi-automated. The present invention adopts a new method in order to overcome the above problems.

If there is no access for the verification within, for example, 10 days after sending an access verification link to the invitor in the primary death determination, the messenger server 100 sends or posts a poll link for death determination to or on the SNS message board of the verifier, designated by the invitor, or the invitor's SNS wall.

However, only when the invitor has allowed access to his or her SNS does post the poll link or is sent on or to the SNS message board of the invitor. The poll is closed within 10 days of sending the poll link. The results of the death determination poll are processed based on the probability computation methodology of the messenger server 100 as described below.

The total number of voters to be calculated is the number of actual voters. The number of verifiers directly designated by the invitor, who are very important to the determination of death, is preferably two or more. As an example, the share of an SNS poll in the death determination may be 50%, and the share of the verifiers may be the remaining 50%. However, if the invitor has not allowed access to an SNS, the share of the verifiers in the poll is 100%.

Accordingly, only when the percentage of the voters who have voted in favor of death in the death determination poll exceeds 50% are the will and message of this invitor released and sent to the invitee(s). If the results of the death determination poll do not clearly indicate death or survival, for example, "50% for death" versus "50% for survival," the closing period of the poll is extended at three-day intervals until getting the result. During this extended period, the decision of a previous vote cast in the poll of the secondary death determination may be changed prior to the expiration of the closing period. If the results of the poll which do not clearly indicate death or survival are obtained, the closing period of the poll is extended and, at the same time, a message indicating that a previous vote may be changed prior to a new deadline is sent to each of the existing voters via the same channel and to the same e-mail address via and to which a message notifying the voter of the poll was sent. This is intended not only to avoid the determination based on the unclear results of the poll but also to, if it is determined that the invitor survivals or is dead during the extended period, give the invitee(s) a chance to change the previous vote, thereby achieving more accurate death determination. When the clear results of the poll are obtained, the messenger server 100 does not extent the period of the poll, but closes the poll.

If the results of the poll are not death but survival, the messenger server 100 resets and goes back to starts the primary death determination again. If the invitor has allowed access to his or her SNS, the secondary death determination is divided into two types: The first type of determination is performed by a poll using the SNS, and the second type of determination is performed by a poll of the verifiers already designated by the invitor.

Votes based on the SNS and the votes of the verifiers are each cast for one of three types of responses: that is, "Yes" (dead), "Uncertain" (don't know & not sure), and "No" (survival) at steps S187a, S187b and S187c. "Yes" is counted as "1", "Uncertain (don't know & not sure)" is counted as "0," and "No" is counted as "0."

Even if responses are "Uncertain (don't know & not sure)" or "No," these responses are included in the total number of responses. When the percentage of votes for "Yes," each of which is counted as "1," exceeds 50%, it is determined that the invitor is dead at step S188a.

The computation method is represented using the scores of responses, as follows:

SNS Answers Probability Percentage (SNS %)

[DEAD (Score of Answers)+DON'T KNOW (Score of Answers)+ALIVE (Score of Answers)/DEAD (Number of Answers)+DON'T KNOW (Number of Answers)+ALIVE (Number of Answers)]/50%

Invitor Assigned Verifiers' Answers Probability Percentage (VERIFIER %)

[DEAD (Score of Answers)+DON'T KNOW (Score of Answers)+ALIVE (Score of Answers)/DEAD (Number of Answers)+DON'T KNOW (Number of Answers)+ALIVE (Number of Answers)]/50%

Secondary Death Determination (SNS %+VERIFIER % on the Basis of 50%)

SNS ANSWERS PROBABILITY PERCENTAGE (SNS %)+INVITOR ASSIGNED VERIFIERS' ANSWERS PROBABILITY PERCENTAGE (VERIFIER %)

Since the verifiers designated in the messenger server 100 by the invitor are very important people who will determine whether the invitor is dead, the verifiers designated by the invitor are the people who the invitor trust and relies, so the share of the verifiers should occupy at least 50% even if the number of verifiers is very small. It will be apparent that the verifiers occupy 100% if access to the SNS has not been allowed.

Furthermore, if any of the verifier designated by the invitor does not agree on the death of the invitor even when many people related to the SNS cast votes for the death of the invitor, the secondary death determination is successively extended at step S188b. It will be apparent that the poll may be successively extended if any one person related to the SNS does not agree on the death of the invitor even when the verifiers all agree on the death of the invitor. However, when access to the SNS has not been allowed, the secondary death determination should be unconditionally performed only by a poll of verifiers designated by the invitor.

In order to prevent each user from casting two or more votes in the poll of the secondary death determination, the user is prevented from casting two or more votes using the IP address of the user and a GPS or by checking the e-mail address of the user. If a user who casts a vote is a member who uses the messenger server 100, restriction may be imposed in the "My account" feature provided in the messenger server 100 or the like.

Meanwhile, if the invitor conducts access verification in the primary death determination during the poll, the poll is closed regardless of the results of the poll and, at the same time, the verifiers and all people participating in the SNS message board and the poll are notified of the determination of the survival of the invitor. The invitor, whose survival has been determined, is subjected back to the common access verification procedure which runs in the messenger server 100.

Furthermore, after the poll of the secondary death determination has been closed, it is determined whether the social security number of "Identification Number that identify the identity" of the invitor has been entered. If the social security number or "Identification Number that identify the identity" of the invitor has been entered, it is checked whether the social security number or "Identification Number that identify the identity" of the invitor is present on a death-record stored in the death-record memory 180 of the messenger server 100. If the number is present on the death-record, the procedure for delivering the will and message of the invitor is performed regardless of the results of the poll in the secondary death determination. This results in more accurate death determination.

Meanwhile, OPTION 4 is a method that enables the invitor to allow the system (that is, messenger server) to access the mobile device(s) of the invitor, and analyzes whether there is a required activity within a predetermined period by analyzing the call log, the Internet usage log, the e-mail log, etc. corresponding to the predetermined period, thereby performing death determination, as already described above.

As described above, the present invention automates all of the procedures, unlike a conventional unreasonable death determination method that requires the death of the invitor to be determined by friends or relatives in a wired or semi-automatic manner, and more accurately and quickly obtains the results of the determination of the death of the invitor using the primary and secondary death determination methods, thus being able to quickly and accurately deliver the will and the message desired by the invitor.

After the death has been determined and if the invitor also wanted and set a mobile phone text determination service, a death determination pass code is sent to the invitor who wanted death determination using a mobile phone text service or the like. If the identical pass code is not sent to the messenger server 100 within a predetermined number of days set by the invitor, it is determined that the invitor is dead. The invitor death determination procedure ("VERI" procedure) corresponding to OPTION 3 is performed as follows. Furthermore, if, as a result of the determination, is determined that the invitor is as survival, the "V" procedure is performed.

After a predetermined number of days have elapsed, the "VERI" procedure is started again.

Death messages for the invitors whose death determinations have been completed in OPTIONS 1 and 3 are posted onto the SNS message boards of the invitors so that the invitee(s) whose access to the SNSs has been allowed can access the SNS message boards. The acts of accessing the message board of the SNS of the invitor and posting, uploading and sharing information via the message board are referred to as "SNS activities."

If the invitor desires, one or more files of the invitor, whose death determination has been completed, that the messenger server 100 holds may be also delivered to a lawyer. Although the invitor may directly select a lawyer, there may be the option of selecting one of lawyers recommended by the messenger server 100. If the invitor changes his or her mind and wants to process the uploaded will and message using another deliver method later, the uploaded files are moved to another folder or server, so that the invitor can use the desired delivery method.

The invitation sent by the invitor and then refused by the invitee(s), as described above, is stored in the invitation refusal DB. If the invitee(s) changes his or her mind and wants to accept the invitation later, the invitee(s) may access the invitation refusal file and accept the invitation. As described above, the present invention provides hybrid functionality which is configured to fit a variety of situations after taking into consideration the situations which may change.

The present invention provides the method of delivering wills and messages, the death of an invitor being verified by one or more invitee(s) close to the invitor and then the will and message of the invitor being delivered to the invitee(s), wherein an invitor can not only efficiently and reliably leave behind a will and a message to one or more invitee(s), but also the death of the invitor can be quickly determined by the invitee(s), thereby improving the reliability of the determination of the death.

Although the preferred embodiments of the present invention have been disclosed for illustrative purposes, those skilled in the techniques will appreciate that various modifications, additions and substitutions are possible, without departing from the scope and spirit of the invention as disclosed in the accompanying claims.

What is claimed is:

1. A method of delivering wills and messages, the method receiving a will and message of an invitor via a messenger server, so that the will and the message can be delivered to one or more invitees, the method comprising:
   a membership subscription step of accessing a messenger server and entering subscriber information, thereby storing the subscriber information and creating an account in a subscriber database (DB) of the messenger server;
   a will and message preparation step of storing the will and the message prepared by the invitor in a will and message DB of the messenger server;
   an invitee selection step of, when the invitees who will receive the will and the message are selected by the invitor via the messenger server, storing information about the selected invitees in the subscriber DB;
   a delivery method determination step of causing one of a plurality of methods for starting delivery of the will and message of the invitor to the invitees to be selected by the invitor via the messenger server and then storing the selected method in delivery method setting memory of the messenger server; and
   a delivery step of, if a requirement for starting delivery of the will and the message stored in the delivery method setting memory is met, delivering the will and the message to the invitees via the messenger server;

wherein the one of methods for starting delivery of the will and the message selected at the delivery method determination step is a method comprising a primary death determination that determines whether the invitor is dead in such a manner that the messenger server determines whether the invitor has made access to the messenger server within a predetermined period, and a secondary death determination that, if the messenger server determines that the invitor has not made access to the messenger server within the predetermined period, determines whether the invitor is dead in such a manner that the messenger server receives information about a selection of one of "Yes (dead)", "Uncertain" and "No (survival)" from each of verifiers.

2. The method of claim 1, wherein the invitee selection step comprises a step of selecting one or more people who will receive the will and the message by sending an invitation prepared by the invitor to the invitees via the messenger server and then receiving information about whether the invitees who received the invitation have accepted the invitation via the messenger server.

3. The method of claim 2, further comprising a step of determining whether the invitor has allowed access to his or her Social Network Service (SNS) via the messenger server and storing results of this determination in the delivery method setting memory of the messenger server;

wherein if the access to the SNS has been allowed, the SNS is used at the delivery step of delivering the will and the message, and one or more users linked to the SNS are set as the invitees.

4. The method of claim 1, further comprising:

a will and message preparation step of storing the will and the message prepared by the invitor in the will and message DB of the messenger server; and a step of determining a location of the invitor using an Internet Protocol (IP) address of a mobile communication terminal of the invitor having accessed the messenger server and a global positioning system (GPS).

5. The method of claim 4, further comprising a step of determining whether the invitor has allowed access to his or her Social Network Service (SNS) via the messenger server and storing results of this determination in the delivery method setting memory of the messenger server;

wherein if the access to the SNS has been allowed, the SNS is used at the delivery step of delivering the will and the message, and one or more users linked to the SNS are set as the invitees.

6. The method of claim 1, wherein the one of methods for starting delivery of the will and the message selected at the delivery method determination step is a method of comparing an identification number that identify the identity of the invitor stored in the subscriber DB with identification number that identify the identity on a death-record provided by a government office, and delivering the will and the message if a death of the invitor has been determined as dead based on the death-record.

7. The method of claim 6, further comprising a step of determining whether the invitor has allowed access to his or her Social Network Service (SNS) via the messenger server and storing results of this determination in the delivery method setting memory of the messenger server;

wherein if the access to the SNS has been allowed, the SNS is used at the delivery step of delivering the will and the message, and one or more users linked to the SNS are set as the invitees.

8. The method of claim 1, wherein the one of methods for starting delivery of the will and the message selected at the delivery method determination step is a method of delivering the will and the message on a certain date and time selected by the invitor via the messenger server.

9. The method of claim 8, further comprising a step of determining whether the invitor has allowed access to his or her Social Network Service (SNS) via the messenger server and storing results of this determination in the delivery method setting memory of the messenger server;

wherein if the access to the SNS has been allowed, the SNS is used at the delivery step of delivering the will and the message, and one or more users linked to the SNS are set as the invitees.

10. The method of claim 1, wherein it is determined that the invitor is dead only when a number of votes for "No (survival)" is less than a set value, even if a percentage of a number of votes for "Yes (dead)" in a poll information exceeds a reference percentage of a number of total votes of the poll.

11. The method of claim 10, further comprising a step of determining whether the invitor has allowed access to his or her Social Network Service (SNS) via the messenger server and storing results of this determination in the delivery method setting memory of the messenger server;

wherein if the access to the SNS has been allowed, the SNS is used at the delivery step of delivering the will and the message, and one or more users linked to the SNS are set as the invitees.

12. The method of claim 1, further comprising, prior to the delivery step of delivering the will and the message, a step of the messenger server accessing a mobile device of the invitor and determining whether mobile device has been used.

13. The method of claim 12, further comprising a step of determining whether the invitor has allowed access to his or her Social Network Service (SNS) via the messenger server and storing results of this determination in the delivery method setting memory of the messenger server;

wherein if the access to the SNS has been allowed, the SNS is used at the delivery step of delivering the will and the message, and one or more users linked to the SNS are set as the invitees.

14. The method of claim 1, wherein when the one of methods for starting delivery of the will and the message selected at the delivery method determination step is changed, the stored will and message can be maintained without change and re-recording or re-entering is not required, and a delivery method of the messenger server is reset based on the changed method for starting delivery of the will and the message and stored in memory.

15. The method of claim 14, further comprising a step of determining whether the invitor has allowed access to his or her Social Network Service (SNS) via the messenger server and storing results of this determination in the delivery method setting memory of the messenger server;

wherein if the access to the SNS has been allowed, the SNS is used at the delivery step of delivering the will and the message, and one or more users linked to the SNS are set as the invitees.

16. The method of claim 1, further comprising a step of determining whether the invitor has allowed access to his or her Social Network Service (SNS) via the messenger server and storing results of this determination in the delivery method setting memory of the messenger server;

wherein if the access to the SNS has been allowed, the SNS is used at the delivery step of delivering the will and the message, and one or more users linked to the SNS are set as the invitees.

* * * * *